US008588846B2

(12) United States Patent
Kazmi (10) Patent No.: US 8,588,846 B2
(45) Date of Patent: Nov. 19, 2013

(54) REPORTING OF MULTIPLE IF/RAT LAYER RESTRICTIONS

(75) Inventor: Muhammad Kazmi, Bromma (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 982 days.

(21) Appl. No.: 12/507,376

(22) Filed: Jul. 22, 2009

(65) Prior Publication Data

US 2010/0041384 A1 Feb. 18, 2010

Related U.S. Application Data

(63) Continuation of application No. PCT/SE2009/050011, filed on Jan. 12, 2009.

(60) Provisional application No. 61/088,483, filed on Aug. 13, 2008.

(51) Int. Cl.
H04M 3/00 (2006.01)
H04M 1/00 (2006.01)
H04B 1/18 (2006.01)
H04W 4/00 (2009.01)
H04W 36/00 (2009.01)

(52) U.S. Cl.
USPC .................. 455/552.1; 455/150.1; 455/151.1; 455/161.1; 455/166.1; 455/168.1; 455/188.1; 455/434; 455/435.2; 455/435.3; 455/419; 455/432.1; 455/436

(58) Field of Classification Search
USPC ............ 455/168.1, 419, 432.1, 435.2, 435.3, 455/552.1, 150.1, 151.1, 161.1, 166.1, 455/188.1, 434
See application file for complete search history.

(56) References Cited

U.S. PATENT DOCUMENTS 7,120,437 B2 * 10/2006 Benson et al. ................ 455/434
2004/0228321 A1 11/2004 Koo
2005/0075074 A1 * 4/2005 Benson et al. ............ 455/67.11

(Continued)

FOREIGN PATENT DOCUMENTS

WO 2004091231 A1 10/2004
WO 2005101887 A1 10/2005
WO 2007103991 A2 9/2007

OTHER PUBLICATIONS

International Preliminary Report on Patentability and Written Opinion issued in Inter. Appln. No. PCT/SE2009/050011 on—Feb. 15, 2011, 5 pages.

(Continued)

Primary Examiner — Vladimir Magloire
Assistant Examiner — Edd Rianne Plata
(74) Attorney, Agent, or Firm — Rothwell, Figg, Ernst & Manbeck, P.C.

(57) ABSTRACT

In one aspect, the invention provides a multi-modal user equipment (UE) configuration method. In some embodiments, the method includes: configuring the UE so that it supports a plurality of radio access technologies (RATs), wherein each of the plurality of RATs is associated with a predetermined maximum number of layers that the UE may be instructed by a network node to monitor simultaneously; configuring the UE so that it is operable to transmit to the network node RAT capability information identifying the plurality of RATs supported by the UE; and configuring the UE to monitor simultaneously not more than X layers associated with one of the plurality of RATs, wherein X is less than the predetermined maximum number of layers associated with the RAT.

16 Claims, 9 Drawing Sheets

(56) References Cited

U.S. PATENT DOCUMENTS

| | | | |
|---|---|---|---|
| 2007/0042775 A1* | 2/2007 | Umatt et al. | 455/434 |
| 2007/0224988 A1* | 9/2007 | Shaheen | 455/436 |
| 2007/0238426 A1* | 10/2007 | Ginzburg et al. | 455/168.1 |
| 2009/0124224 A1* | 5/2009 | Hildebrand et al. | 455/150.1 |

OTHER PUBLICATIONS

International Search Report issued on Oct. 22, 2009 in International application No. PCT/SE2009/050011, 4 pages.

* cited by examiner

REPORTING OF MULTIPLE IF/RAT LAYER RESTRICTIONS

CROSS-REFERENCE TO RELATED APPLICATIONS

This application claims the benefit of provisional patent application no. 61/088,483, filed on Aug. 13, 2008, and this application is a continuation of international patent application no. PCT/SE2009/050011, filed on Jan. 12, 2009. The above-identified applications are incorporated herein by this reference.

TECHNICAL FIELD

The present invention relates to mobile communications in environments having multiple radio access technologies, each with one or more layers available for mobility of user equipments (UEs).

BACKGROUND

Evolving radio communications technologies create mobile communications environments having variable sets of radio access technologies (RATs). For example, in a given geographical area, the following RATs may be available: Wideband Code Division Multiple Access (WCDMA), Universal Terrestrial Radio Access Network (UTRAN) and Evolved UTRAN (E-UTRAN). In another geographical area, a different set of RATs may be available; for example, only Global System for Mobile communications (GSM) may be available. A mobile terminal user would want a mobile terminal capable of operating in both areas. Thus, mobile terminal manufacturers offer mobile terminals (a.k.a., user equipments (UEs)) capable of operating with multiple RATs (i.e., multi-mode UEs).

Users also desire seamless UE mobility within and between geographic areas. Thus, manufacturers of UEs face the further demand for multi-mode UEs with a high degree of RAT interoperability to support transparent mobility. For example, given the mobile communications environment discussed in the preceding paragraph, a user may wish to initiate a call in the geographic area covered by GSM and have full call continuity as the UE travels from that area to the area covered by E-UTRAN. Thus, the UE must be capable of monitoring channels in both RATs while a call is in progress.

Fortunately, E-UTRAN, often referred to as Long Term Evolution (LTE), provides for such multi-RAT connected mode mobility. However, LTE imposes a burden on UEs to monitor up to three layers (i.e., non-serving frequency carriers), as instructed by the network, for each RAT supported, regardless of the number of RATs that are supported by the UE. On each layer the UE is required to monitor multiple cells e.g. between 4-6 cells per layers depending upon the type of RAT. Thus, LTE requires a multi-mode UE capable of operating with, for example, four RATs (e.g. multi-mode UE supporting LTE FDD, LTE TDD, UTRAN FDD and UTRAN TDD), to monitor up to twelve layers in parallel in a mobile communications environment having those four RATs. Assuming 5 cells to be monitored per layers, such a UE will have to monitor in total 60 cells in parallel (i.e., using the same gap pattern.) Parallel monitoring implies that UE monitors all the requested layers during a single periodic gap. In LTE, gap patterns with two different periodicity are define: 6 ms gap occurring every 40 or 6 ms gap occurring every 80 ms. Only one of them can be activated at a time. The LTE layer monitoring requirements means that a UE manufacturer must weigh considerable cost/benefit tradeoffs for each additional RAT supported by the UE as each additional supported RAT means that additional memory, radio, and computational resources are required to accommodate the increased layer monitoring requirements. Thus, it is desirable for the UE to have some control over layer monitoring requirements imposed by the network.

SUMMARY

In one aspect, the present invention provides a method performed by a base station. In some embodiments, the method includes the following steps: (1) receiving capability information from a UE, where the capability information includes RAT capability information identifying a set of RATs supported by the UE, where each RAT is associated with a predetermined maximum number of layers that the UE may be instructed to monitor simultaneously, were the predetermined maximum number of layers is a standardized value; (2) for at least one of the RATs in the set of RATs supported by the UE, determining a number of layers of the RAT to instruct the UE to monitor, where the determined number of layers is less than the predetermined maximum number of layers associated with the RAT; and (3) transmitting to the UE RAT layer monitoring information, wherein the RAT layer monitoring information indicates the determined number of layers that the UE should monitor on the RAT. In some embodiments, the determination of the number of layers of the RAT to instruct the UE to monitor is based on, at least in part, at least some of the received capability information.

In some embodiments, the method further includes a step of storing configuration information that, for each of sets of RATs, associates a number with at least one RAT included in the set, where the number represents a number of layers associated with the RAT. The determining step further includes accessing the configuration information and using the configuration information to determine the number of layers associated with the RAT to instruct the UE to monitor.

In some embodiments, the step of using the configuration information includes finding the set of RATs included in the configuration information that matches the RATs identified by the RAT capability information.

In some embodiments, the capability information further comprises RAT layer capability information indicating that the UE is configured to monitor less than the predetermined maximum number of layers associated with at least one of the RATs included in the set of RATs. In these embodiments, the RAT layer capability information may comprise: (1) for each RAT included in the set of RATs, a number associated with the RAT, the number representing a maximum layer monitoring capability; (2) for at least one of the RATs included in the set of RATs, a number associated with the RAT, the number representing a maximum layer monitoring capability and the number being less than the predetermined maximum number associated with the RAT; or (3) for each RAT included in the set of RATs, a single bit, wherein the value of the bit identifies whether or not the UE is configured to monitor the predetermined maximum number of layers associated with the RAT.

In another aspect, the invention provides an improved base station. In some embodiments, the improved base station includes: (1) a receiver operable to receive capability information transmitted from a UE, where the capability information includes RAT capability information identifying a set of RATs supported by the UE, where each RAT included in the set is associated with a predetermined maximum number of layers that the UE may be instructed to monitor; (2) a RAT layer determining module configured to determine the number of layers of a RAT to instruct the UE to monitor, where the determined number of layers may be (a) equal to the predetermined maximum number of layers associated with the RAT or (b) less than the predetermined maximum number of layers associated with the RAT, and the RAT layer determining module is configured to make the determination based, at least in part, on at least some of the received capability information; (3) a transmitter operable to transmit to the UE RAT layer monitoring information, where the RAT layer monitoring information indicates the number of layers of the RAT that the UE should monitor.

In some embodiments, the base station further includes a data storage device for storing configuration information that, for each of sets of RATs, associates a number with at least one RAT included in the set, where the number represents a number of layers associated with the RAT and the RAT layer determining module may be configured to determine the number of layers by accessing the configuration information and using the configuration information to determine the number of layers associated with the RAT to instruct the UE to monitor.

In some embodiments, the RAT layer determining module is configured to use the configuration information by finding the set of RATs included in the configuration information that matches the RATs identified by the RAT capability information.

In another aspect, the invention provides a method performed by a UE for informing a network node of the UE's RAT capabilities. In some embodiments, the method includes the steps of: (1) determining whether capability information should be sent to the network node and (2) transmitting capability information to the network node in response to determining that the capability information should be sent to the network node, were the transmitted capability information includes: (a) RAT capability information identifying RATs supported by the UE (each of the RATs being associated with a predetermined maximum number of layers that the UE may be instructed by the network node to monitor) and (b) RAT layer capability information indicating that the UE is configured to monitor less than the predetermined maximum number of layers associated with at least one of the RATs.

In some embodiments the method further includes: receiving from the network node RAT layer monitoring information, where the RAT layer monitoring information includes information indicating the number of layers that the UE should monitor on a specified RAT, and, in response to receiving the RAT layer monitoring information, monitoring not more than the number of layers on the specified RAT, wherein the number of layers is less than the predetermined maximum number of layers associated with the RAT.

In some embodiments, the step of monitoring the layers on the specified RAT comprises identifying new cells belonging to the layers. In some embodiments, the step of monitoring the layers on the specified RAT further comprises: performing one or more downlink measurements on the identified new cells; and/or evaluating one or more events associated with one or more of the identified new cells.

In another aspect, the invention provides an improved UE. In some embodiments, the improved UE includes: (1) a receiver operable to receive information transmitted from a network node; (2) a capability information module configured to create a message comprising capability information, the capability information comprising (a) radio access technology (RAT) capability information identifying a plurality of RATs supported by the UE, wherein each of the plurality of RATs is associated with a predetermined maximum number of layers that the UE may be instructed by the network node to monitor and (b) RAT layer capability information indicating that the UE is configured to monitor less than the predetermined maximum number of layers associated with at least one of the plurality of RATs; (3) and a transmitter operable to transmit the message to the network node.

In another aspect, the invention provides a multi-modal UE configuration method. In some embodiments, the method includes the following steps: (1) configuring the UE so that it supports a plurality of radio access technologies (RATs), wherein each of the plurality of RATs is associated with a predetermined maximum number of layers that the UE may be instructed by a network node to monitor simultaneously; (2) configuring the UE so that it is operable to transmit to the network node capability information, the capability information comprising RAT capability information identifying the plurality of RATs supported by the UE; and (3) configuring the UE to monitor simultaneously not more than X layers associated with one of the plurality of RATs, wherein X is less than the predetermined maximum number of layers associated with the RAT. In some embodiments, the UE is configured to monitor layers associated with a RAT by identifying new cells belonging to the layers and performing one or more downlink measurements on the identified new cells and/or evaluating one or more events associated with one or more of the identified new cells.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements.

DETAILED DESCRIPTION

Figure 1:
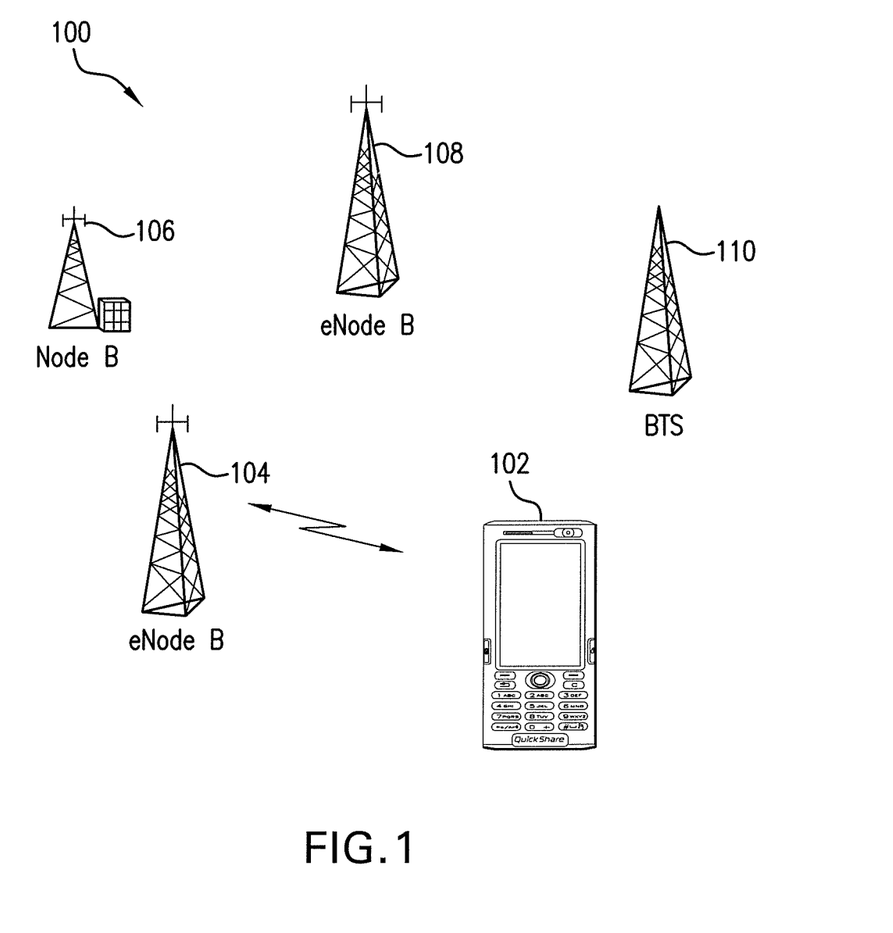
FIG. 1 illustrates a mobile radio communications system.

As illustrated in FIG. 1, an exemplary mobile radio communications system 100 includes multiple radio base stations such as eNode B 104, Node B 106, eNode B 108, and Base Transceiver Station (BTS) 110. The radio base stations may each support one or more cells in RATs such as:
E-UTRA Frequency Division Duplexing (FDD),
E-UTRA Time Division Duplexing (TDD),
UTRA FDD,
UTRA TDD,
CDMA2000 High Rate Packet Data (HRPD),
CDMA2000 1× Radio Transmission Technology (RTT), and GSM.
System 100 may also include multiple mobile terminals, such as User Equipment (UE) 102.

UE 102 is capable of mobility between the cells of mobile radio communications system 100. Generally, UE mobility refers to both idle mode mobility (UE cell reselection) and connected mode mobility (involving handover of calls in progress). Cell reselection is generally a UE autonomous function not requiring the intervention of the serving cell, although some UE behavior may be controlled by broadcast system parameters and performance specifications. Connected mode mobility, on the other hand, is fully controlled by the network through explicit UE specific commands and by performance specifications.

Mobility decisions are based on downlink measurements. Downlink measurements include intra-frequency, inter-frequency (IF), and inter-RAT (IRAT) measurements. These measurements may include identifying new or unknown cells, measuring signal strength of identified cells, measuring signal quality of identified cells, etc. Using one or more measurements, the UE may report the measurements and/or one or more events, such as the signal strength of the strongest target cell on carrier frequency (layer) rising above a threshold. The network uses the reported measurement results and/or event to take mobility actions (e.g. sending a handover command to the UE). In LTE, the UE performs connected mode inter-frequency and IRAT measurements in periodic gaps which occur during time slots having no downlink transmissions. These time slots exist for the purpose of enabling the UE to measure on inter-frequency cells or on other RATs. A single gap pattern may be shared for all measurements on different inter-frequency and RAT layers.

As discussed in the background section above, a prior art UE may be required to perform and report measurements of cells distributed over a large number of layers to support various intra-frequency, inter-frequency, and IRAT mobility scenarios.

In LTE, downlink quality measurements specified for mobility determinations include reference symbol received power (RSRP) and reference symbol received quality (RSRQ). These measurements are performed by the UE on a cell level basis on reference symbols.

In UTRAN FDD (WCDMA), downlink quality measurements for mobility reasons include common pilot channel (CPICH) RSCP, CPICH Ec/No, and UTRA carrier RSSI [1]. The first two of the above measurements are performed by the UE on cell level basis. UTRA carrier RSSI is measured over the entire frequency carrier. In cdma2000 1× RTT and HRPD systems, cdma2000 Pilot Strength and HRPD Pilot Strength respectively are measured and used for mobility determinations. In GSM, GSM carrier RSSI is used for all types of mobility decisions.

In the RATs described above, one frequency carrier is provided to each cell, with GSM as an exception. In GSM, a frequency band is subdivided into frequency carriers and each cell provided with a subset of the total number of frequency carriers available.

In order to guarantee good mobility performance, the E-UTRAN specification provides for minimum UE requirements for measurement performance and reporting of downlink measurements. One active (connected) mode requirement is identification delay of unknown cells for the given received level of the corresponding synchronization and reference signals. This is the time required to search an unknown cell and to decode its physical layer identity. Once the cell is identified, the UE continues measuring and evaluating it. Another active mode requirement is the minimum number of identified cells for which UE is supposed to report the CPICH measurements. Other requirements include absolute and relative accuracies and the measurement period over which the specified measurement accuracies of the reported cells are fulfilled. Monitoring of a layer is a general term referring to cell identification and/or measurement process. Thus, in some embodiments, monitoring a layer means that the UE identifies cells belonging to the layer and then performs one or more downlink measurements on the identified new cells and/or evaluates one or more events associated with one or more of the identified new cells.

Minimum layer monitoring requirements are specified separately for E-UTRA intra-frequency TDD/FDD, E-UTRA inter-frequency FDD/TDD, and IRAT (including UTRA FDD/TDD, GSM, HRPD and cdma2000 1× RTT). In particular, UEs are required to measure a number of carrier frequencies per RAT. Furthermore, a UE should be able to measure a certain number of cells per carrier frequency per RAT. For example, let M be the number of RATs supported by the UE, K be the required number of cells per carrier frequency per RAT that UE should be able to measure, and N be the required carrier frequencies per RAT to be supported by the UE. In this scenario, the network can theoretically instruct the UE to simultaneously measure M×K×N cells in total.

For simplicity and consistency, this disclosure refers to a carrier frequency as a layer. LTE requirements for layer monitoring per RAT may include:
3 E-UTRA FDD layers (for IF measurements),
3 E-UTRA TDD layers (for IF measurements),
3 UTRA FDD layers (for RAT measurements),
3 UTRA TDD layers (for RAT measurements),
3 HRPD carriers,
3 cdma2000 1× carriers, and
1 GSM layer (corresponding to 32 GSM carriers).

As can be seen, a UE capable of supporting all or even a larger number of RATs would be required to perform a large number of parallel measurements. In the worst case, the total number of layers, including one GSM layer, is nineteen, an exorbitant number.

Because all combinations of E-UTRA inter-frequency and RATs are unlikely to be deployed in one geographic area by a single operator, a UE is likely to be requested to monitor only a subset of IF/RAT layers at a time. Similarly, many UEs will be capable of supporting combinations of layers corresponding to typical scenarios. Exemplary deployment scenarios are listed in table 1.

TABLE 1

| Scenario No. | IFs and RATs | IF/RAT layers to be monitored |
|---|---|---|
| 1 | E-UTRAN FDD IF, UTRAN FDD and GSM | 7 |
| 2 | E-UTRAN TDD IF, UTRAN TDD and GSM | 7 |
| 3 | E-UTRAN FDD IF, HRPD and cdma2000 1× RTT | 9 |
| 4 | E-UTRAN TDD IF, HRPD and cdma2000 1× RTT | 9 |

TABLE 1-continued

| Scenario No. | IFs and RATs | IF/RAT layers to be monitored |
|---|---|---|
| 5 | E-UTRAN FDD IF, E-UTRAN TDD, UTRAN FDD and GSM | 10 |
| 6 | E-UTRAN FDD IF, E-UTRAN TDD, UTRAN TDD and GSM | 10 |
| 7 | E-UTRAN FDD IF, E-UTRAN TDD, UTRAN TDD, UTRAN FDD and GSM | 13 |
| 8 | E-UTRAN TDD IF, E-UTRAN FDD IF, HRPD and cdma2000 1x RTT | 12 |

It may be observed from the above listed scenarios in Table 1 that, in many cases, a UE will not be required to simultaneously monitor more than ten layers. However, in some scenarios, such as scenarios 7 and 8, the UE will be required to monitor more than ten layers.

Because the number of RATs supported by a UE is a UE capability, there will be UEs in the market with differing RAT capabilities. UE manufacturers will build UEs according to typical deployment scenarios and market needs. Nevertheless, UE manufacturers should not be discouraged from manufacturing UEs capable of supporting more RATs because the UE would require greater radio, storage, and processing resources to monitor and report on the greater number of layers; rather, the UE should be allowed some control of the numbers of layers to be monitored, thus reducing UE complexity and cost. Such control would provide relaxation regarding maximum numbers of layer monitoring per RAT and should be acceptable for the network as not all combinations of IFs and RATs will be used in one location. Also, not all measurements are typically needed at a single time as this could require the UE to spend time performing measurements practically indefinitely.

The UE may not need relaxation in all situations. For example, scenarios 1-5 in Table 1 show that the UE should be able to handle at least ten different layers on various RATs (including one GSM layer). Ten layers (or another suitable threshold) may be a manageable number of layers to monitor for some UE architectures. Thus, a multi-RAT UE that would otherwise be required to support more than ten layers should be allowed to implement a lower number of layers than the standardized values. In this case, the network should be informed about the reduction to be applied. The network must have information regarding UE mobility measurement capabilities in to order be able to instruct the UE to measure cells and layers for which the UE has capability and capacity.

Figure 2:
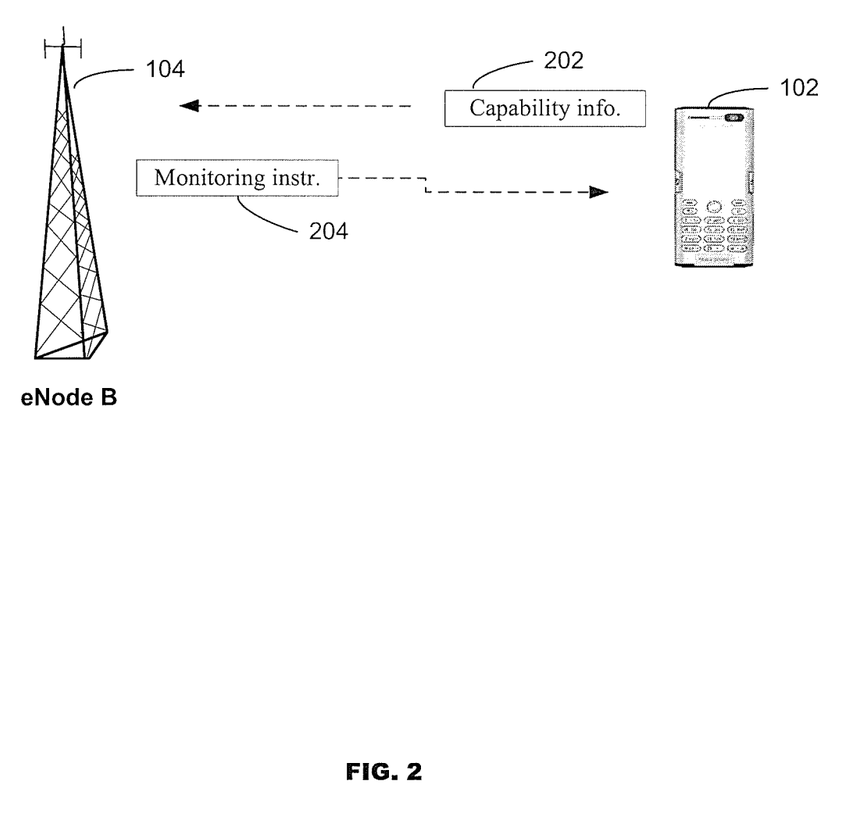
FIG. 2 illustrates a UE and a base station communicating information and instructions in accordance with an embodiment of the invention.

Therefore, various embodiments of the present invention provide for various means of reporting by a UE 102 and instructing a UE 102 as to layer monitoring requirements. In accordance with embodiments of the invention, UE 102 transmits capability information 202 to eNode B 104 illustrated in FIG. 2. eNode B 104 determines layer monitoring requirements and transmits layer monitoring instructions 204.

Figure 3A:
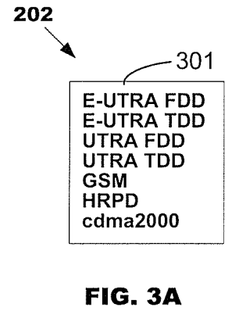
FIGS. 3A-3E illustrate capability message formats according to various embodiments of the invention.

In an exemplary embodiment of the present invention as illustrated in FIG. 3A, capability information 202 consists of a list of supported RATs 301. According to this embodiment, the list of supported RATs 301 may correspond to a predefined scenario for relaxation of layer monitoring requirements as illustrated in Table 2. In one aspect of this embodiment, bits in an ordered bit-map could represent UE support (or lack of support) for a given RAT. In accordance with this aspect of the embodiment, the UE transmit to a base station information corresponding to one of the predefined scenarios. According to the example illustrated in FIG. 3A, capability information 202 indicates that the UE 102 supports a scenario having all seven IF/RATs indicated in the LTE mobility specification. Such a multi-RAT UE may implement a layer relaxation as indicated, for example, in scenario 9 in Table 2 below.

TABLE 2

| | Frequency Layers per RAT | | | | | | | | |
|---|---|---|---|---|---|---|---|---|---|
| Predefined Scenario No | E-UTRA FDD IF | E-UTRA TDD IF | UTRA FDD | UTRA TDD | GSM | HRPD | cdma2000 1x RTT | Maximum layers | Comments |
| 1 | 3 | — | 3 | — | 1 | — | — | 7 | No relaxation |
| 2 | — | 3 | — | 3 | 1 | — | — | 7 | No relaxation |
| 3 | 3 | — | — | — | — | 3 | 3 | 9 | No relaxation |
| 4 | — | 3 | — | — | — | 3 | 3 | 9 | No relaxation |
| 5 | 3 | 3 | 3 | — | 1 | — | — | 10 | No relaxation |
| 6 | 3 | 3 | — | 3 | 1 | — | — | 10 | No relaxation |
| 7 | 3 | 2 | 2 | 2 | 1 | — | — | 10 | Relaxation up to 3 layers as compared to 7 in table 1 |
| 8 | 3 | 3 | — | — | — | 2 | 2 | 10 | Relaxation up to 2 layers as compared to 8 in table 1 |
| 9 | 2 | 2 | 2 | 2 | 1 | 2 | 2 | 13 | Relaxation up to 6 layers assuming all IF/RAT |

One advantage of having predefined sets of layer monitoring maximums per RAT is that the UE can inform the network of its capabilities by referring to the scenario(s) it is capable of handling. Note that scenarios 1-6 in Table 2 correspond to scenarios 1-6 in Table 1. Scenarios 7 and 8, however, provide for a relaxation of the UE capability as compared to scenarios 7 and 8 in Table 1. Scenario 9 represents the case where all RAT layers are to be supported, albeit with reduced numbers of layers monitored per RAT relative to LTE standardized numbers.

Figure 3B:
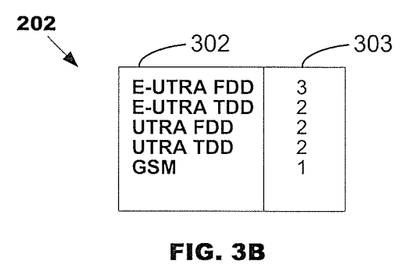

In another embodiment illustrated in FIG. 3B, capability information 202 consists of a list of RATs 302 supported by the UE 102 and a corresponding list of numbers of layers 303. In this embodiment, UE 102 reports how many layers it supports per RAT. In one aspect of this embodiment, capability information 202 may consist only of an ordered list of numbers of layers 303, where a position in the list corresponds to a RAT.

In some embodiments, if the total standard number of layers to be monitored for the RATs supported by UE 102 as specified in a standard would exceed a threshold T (e.g., 10 layers), then UE 102 may implement S-D layers per RAT, provided that S-D is not lower than threshold T, where S is the number of layers per RAT corresponding to a full capability as defined in, for example, an LTE specification and D is a predefined number (e.g., 1). In this embodiment, the chosen RAT(s) to which reduction is applied is UE implementation dependent since there is no pre-defined value. Thus, UE 102 reports the number of layers it supports for each RAT it supports. For the example illustrated in FIG. 3B, UE capability information 202 indicates that UE 102 will support monitoring of 3 E-UTRA FDD layers, 2 E-UTRA TDD layers, 2 UTRA FDD layers, 2 UTRA TDD layers, and 1 GSM layer.

Figure 3C:
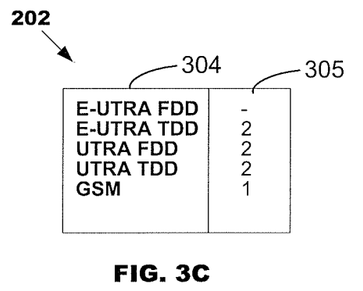

In another embodiment, as illustrated in FIG. 3C, capability information 202 consists of a list of supported RATs 304 and corresponding layer capability information 305. In this embodiment, UE 102 explicitly reports its layer capability for a RAT only if the number of supported layers for the RAT is less than that corresponding to the standardized number (i.e., the requirement specified in a standard such as, for example, 3GPP TS 36.133, "Evolved Universal Terrestrial Radio Acess (EUTRA); Requirements for support of radio resource management"). Thus, if for a particular RAT UE 102 does not explicitly report its layer capability for the RAT, this implies that UE 102 is fully capable of supporting the standardized number of layers for the RAT. For the example illustrated in FIG. 3C, capability information 202 indicates that UE 102 will support monitoring of 2 E-UTRA TDD layers, 2 UTRA FDD layers, 2 UTRA TDD layers, and 1 GSM layer. Additionally, the capability information indicates that UE 102 is capable of supporting E-UTRA FDD and will support monitoring of the standard specified number of layers in this IF/RAT.

Figure 3D:
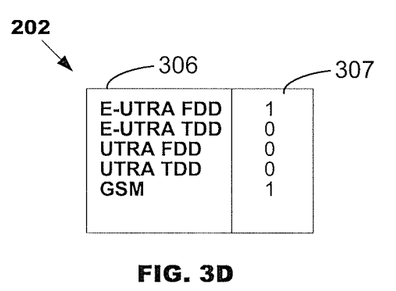

In another embodiment, as illustrated in FIG. 3D, capability information 202 consists of a list of RATs 306 and corresponding layer capability information 307. In this embodiment, UE 102 reports whether it supports full layer monitoring capability per RAT or not (i.e., 1 bit of information per inter-frequency or RAT scenario). In this embodiment, the network can specify a certain minimum number of layers for each RAT. Thus, a UE not supporting full capability would imply the minimum value. In the example illustrated in FIG. 3D, capability information 202 indicates that UE 102 will support monitoring of E-UTRA FDD, E-UTRA TDD, UTRA FDD, UTRA TDD, and GSM layer. The capability information also indicates that UE 102 will support monitoring of the standard number of layers for E-UTRA FDD and GSM and will only support monitoring a reduced number of layers for E-UTRA TDD, UTRA FDD, and UTRA TDD. For these RATs, the number of layers UE 102 may be instructed to monitor is reduced by a predetermined amount (e.g., 1) from the standardized number.

Figure 3E:
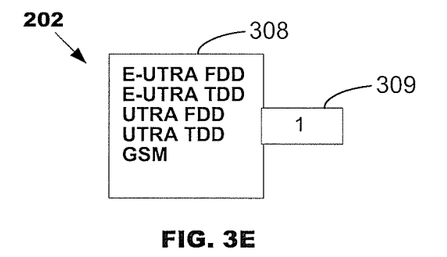

In another embodiment, as illustrated in FIG. 3E, capability information 202 consists of list 308 and indicator bit 309. List 308 indicates which RATs are supported by UE 102 and indicator bit 309 indicates whether UE 102 supports a reduced number of layers for monitoring of one or more of the listed RATs. In this embodiment, the network can specify a certain minimum number of layers for each RAT. Thus, a UE not supporting full capability would imply the minimum value. That is, if bit 309 is set to zero (0), this would indicate that the UE is not capable of monitoring the standard number of layers and the network will assume that the UE can only handle the minimum number of layers for each RAT.

In the embodiments illustrated in FIGS. 3A-3E, the UE capability with respect to the GSM RAT may be assumed to be one layer, corresponding to 32 GSM carriers, without this being explicitly reported by UE 102.

Figure 4:
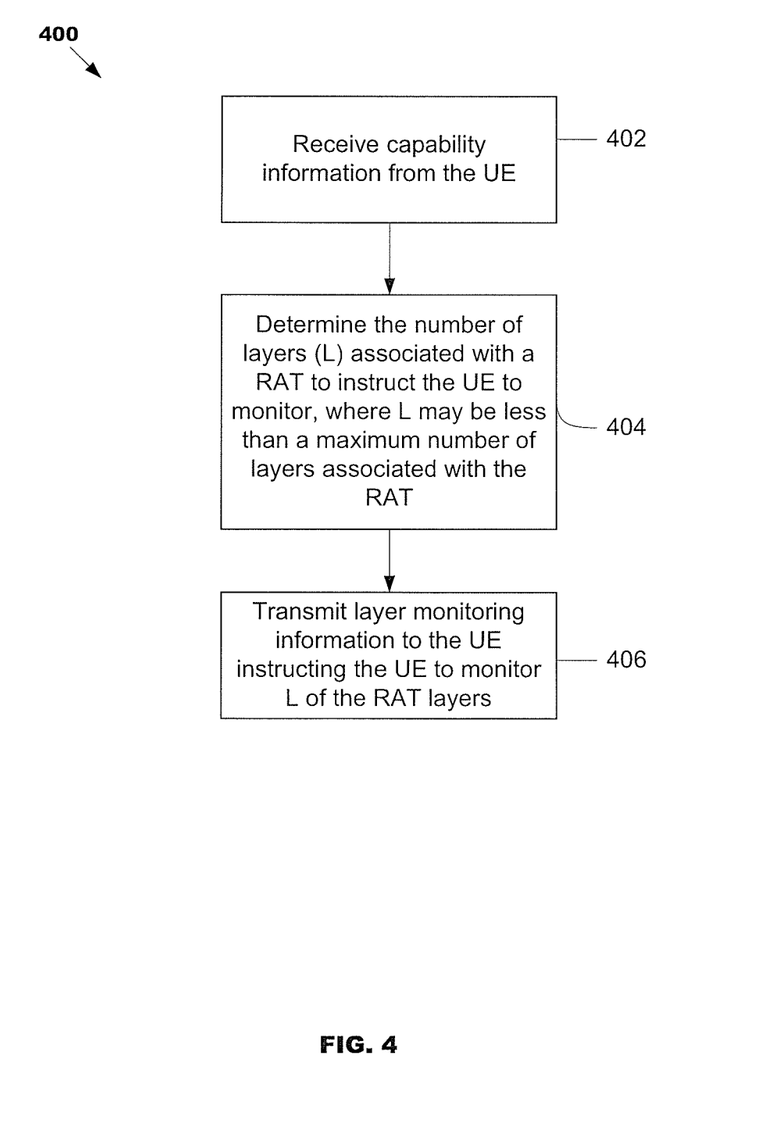
FIG. 4 illustrates a method which may be implemented at base station, or other node, in accordance with an embodiment of the invention.

Referring now to FIG. 4, FIG. 4 is a flow chart illustrating a process 400, according to an embodiment of the invention, that is performed by a base station (e.g., base station 110, 104, 108) or other node. Process 400 may begin in step 402, where the base station receives RAT capability information 202 from the UE 102 (e.g., base station receives on of the messages 301, 302, 304, 306 or 308). In step 404, the base station uses the received capability information to determine the number of layers L associated with a RAT to instruct UE 102 to monitor. L may be less than a standard set maximum number of layers S associated with the RAT. In step 406, the base station transmits layer monitoring instructions to UE 102, instructing UE 102 to monitor L of the RAT layers. Preferably, step 404 is performed for each RAT that the UE supports as indicated in the RAT capability information.

Figure 5:
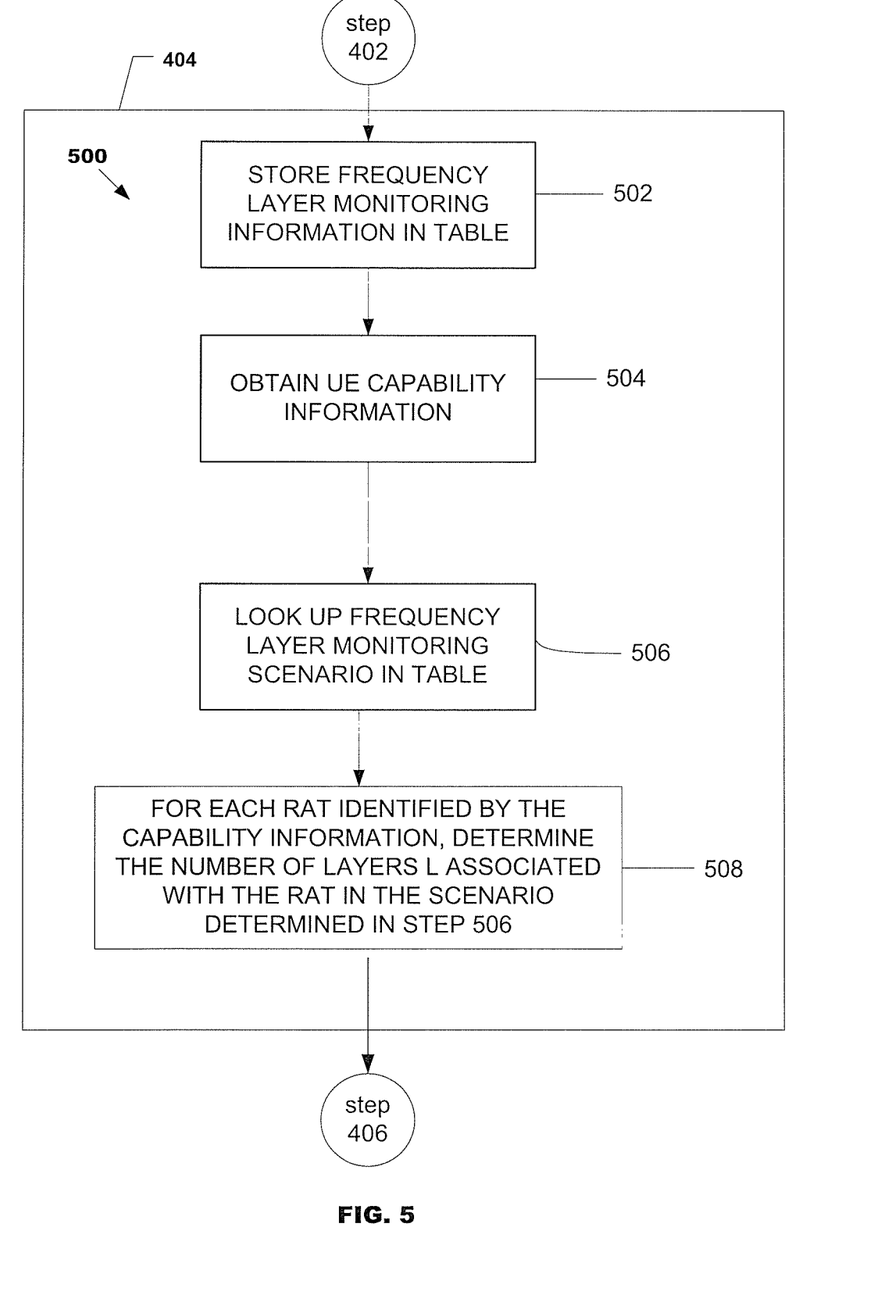
FIG. 5 illustrates a method which may be implemented at a base station or other node in accordance with an embodiment of the invention.

Referring now to FIG. 5, FIG. 5 is a flow chart illustrating a process 500, according to some embodiments, for performing step 404 (that is, for determining the number of layers L of a RAT to instruct the UE to monitor). Process 500 may begin in step 502, where the base station stores configuration information that defines a set of RAT scenarios (see e.g., the scenario table shown in Table 2). That is, the base station stores configuration information that, for each of a plurality of sets of RATs (i.e., plurality of RAT scenarios), associates a number with at least one RAT included in the set of RATs, wherein the number represents a number of layers associated with the RAT. For example, for each RAT scenario defined by the configuration information, the configuration information includes, for each RAT in the scenario, information identifying the number of layers L of the RAT that the base station should instruct the UE to monitor.

In step 504, the base station obtains the UE's capability information 301, which capability information 301 identifies a RAT scenario (i.e., the set of RATs supported by the UE).

In step 506, the base station access the configuration information to determine the RAT scenario included in the set of RAT scenarios that matches the RAT scenario reported by the UE. That is, the base station finds the set of RATs included in the configuration information that matches the set of RATs identified by the RAT capability information received in step 504.

In step 508, the base station determines, for each RAT identified by capability information 301, the number of layers L associated with the RAT in the scenario determined in step 506. This number of layers L represents the number of layers of the RAT that the base station will instruct the UE to monitor.

In other embodiments, the step of determining the number of layers L of a RAT to instruct the UE to monitor is performed without using a scenario table. For example, as discussed above with reference to FIGS. 3B-E, the UE may transmit capability information to a base station that explicitly or implicitly identifies the UE layer monitoring capability for each RAT supported by the UE. Thus, the determination as to the number of layers L of a RAT to instruct the UE to monitor is based on, at least in part, the capability information the UE transmits to the base station.

Figure 6:
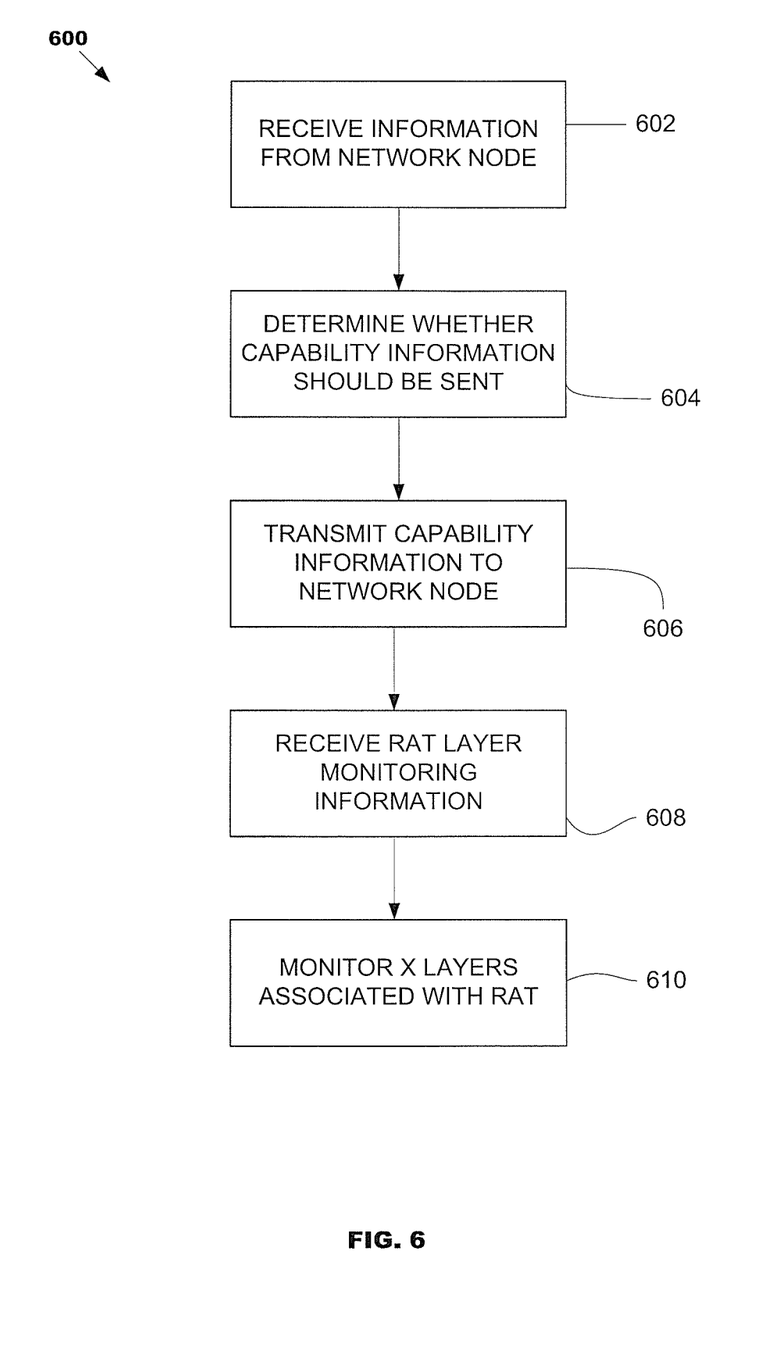
FIG. 6 illustrates a method which may be implemented by a UE in accordance with an embodiment of the present invention.

Referring now to FIG. 6, FIG. 6 is a flow chart illustrating a process 600, according to some embodiments, that may be performed by UE 102. Process 600 may begin in step 602, where UE 102 receives information from one or more network nodes (e.g., a base station shown in FIG. 1). In step 604, UE 102 determines whether UE 102 should transmit capability information to the network node.

In step 606, UE 102, in response to determining that UE 102 should transmit capability information to the network node, transmit the capability information to the network node. As discussed above with reference to FIGS. 3B-3E, the capability information may include RAT capability information identifying a set of RATs supported by the UE together with RAT layer capability information indicating that the UE is configured to monitor less than a predetermined maximum number of layers associated with at least one of the RATs in included in the set. For example, as shown in FIG. 3B, the RAT layer capability information may include, for each RAT included in the set of RATs, a number associated with the RAT, where the number represent the maximum number of layers of the RAT the UE should be instructed to monitor. And, as shown in FIG. 3D, the RAT layer capability information may include, for each RAT included in the set of RATs, a one-bit value, where the value of the one bit identifies whether the UE is capable of monitoring a predetermined maximum number of layers associated with the RAT that is defined in a standard.

In step 608, UE 102 receives from the network node RAT layer monitoring information, wherein the RAT layer monitoring information comprises information indicating the number of layers associated with a RAT that the UE should monitor. In step 610, in response to receiving the RAT layer monitoring information, UE 102 monitors not more than X layers associated with the RAT, wherein X is less than the predetermined maximum number of layers associated with the RAT.

Figure 7:
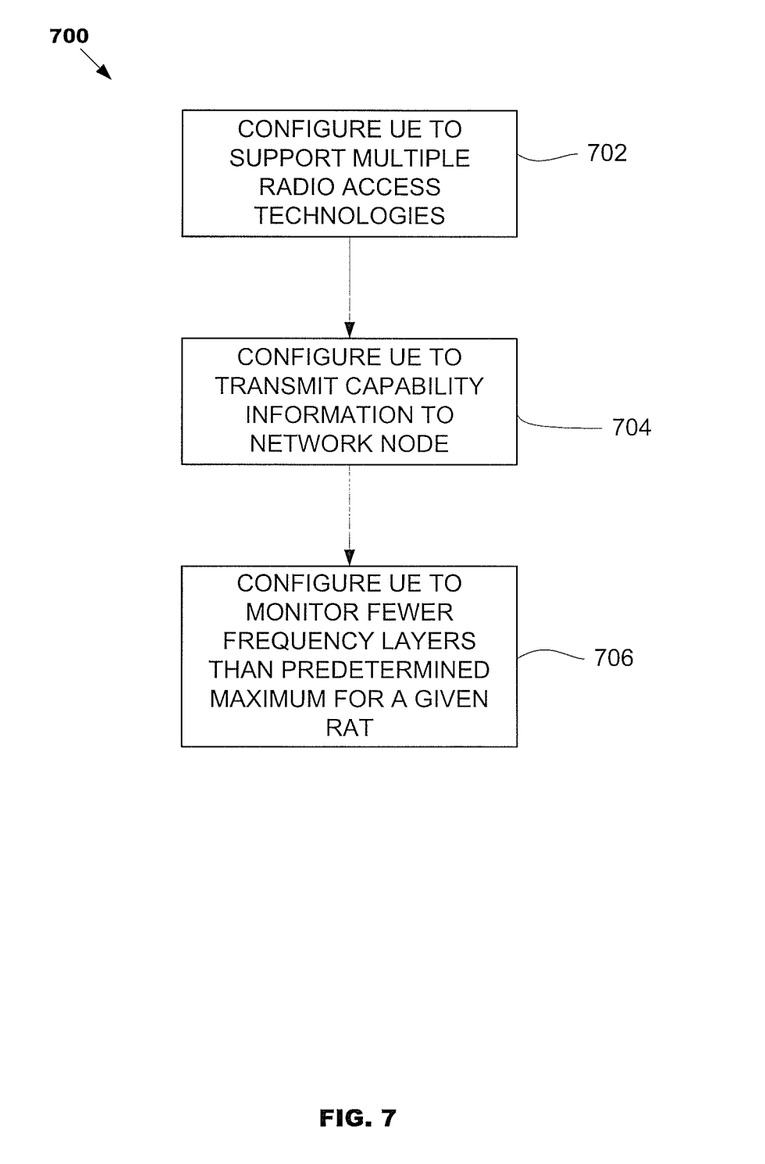
FIG. 7 illustrates a method of manufacturing a UE in accordance with an embodiment of the present invention.

Referring now to FIG. 7, FIG. 7 is a flow chart illustrating a process 700, according to some embodiments, for making a UE 102. Process 700 may begin in step 702, where UE 102 is configured to support multiple RATs. In step 704, UE 102 is configured to transmit RAT layer monitoring capability information 202 to a network node. For example, the UE 102 may be configured to transmit the capability information described above with reference to FIGS. 3B-3E. In step 706, UE 102 is configured to monitor fewer layers in a given RAT than a predetermined maximum number of layers in the RAT that is defined in a standard.

Figure 8:
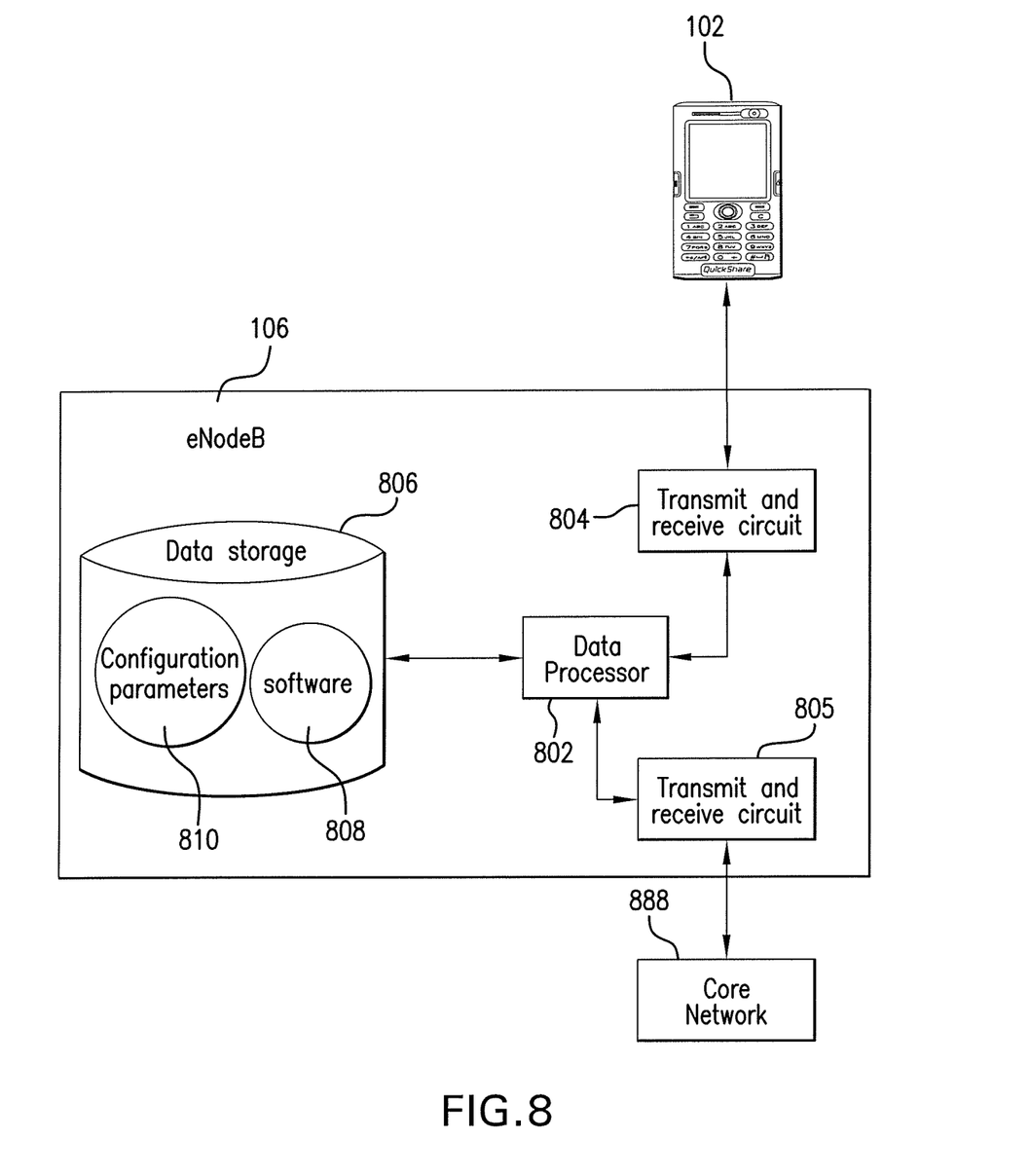
FIG. 8 illustrates a base station in accordance with an embodiment of the present invention.

Referring now to FIG. 8, FIG. 8 is a functional block diagram of base station 106 according to some embodiments of the invention. As shown, base station 106 may comprise a data processing system 802 (e.g., one or more microprocessors), a data storage system 806 (e.g., one or more non-volatile storage devices) and computer software 808 stored on the storage system 806. Configuration parameters 810 (e.g., the above-scenario table) may also be stored in storage system 806. Base station 106 also includes transmit/receive (Tx/Rx) circuitry 804 for transmitting data to and receiving data from UE 102 and transmit/receive (Tx/Rx) circuitry 805 for transmitting data to and receiving data from, for example, a core network node 888. Software 808 is configured such that when processor 802 executes software 808, base station 106 performs steps described above (e.g., steps described above with reference to the flow charts shown in FIGS. 4 and 5). For example, software 808 may include: (1) computer instructions (e.g., a RAT layer determining module) for determining the number of layers associated with a RAT to instruct a UE to monitor, wherein the determined number of layers may be (a) equal to a predetermined maximum number of layers associated with the RAT or (b) less than said predetermined maximum number of layers associated with the RAT. The RAT layer determining module may be configured to make the determination based, at least in part, on capability information received from the UE.

Referring now to FIG. 8, FIG. 8 is a functional block diagram of base station 106 according to some embodiments of the invention. As shown, base station 106 may comprise a data processing system 802 (e.g., one or more microprocessors), a data storage system 806 (e.g., one or more non-volatile storage devices) and computer software 808 stored on the storage system 806. Configuration parameters 810 (e.g., the above scenario table) may also be stored in storage system 806. Base station 106 also includes transmit/receive (Tx/Rx) circuitry 804 for transmitting data to and receiving data from UE 102 and transmit/receive (Tx/Rx) circuitry 805 for transmitting data to and receiving data from, for example, a core network node 888. Software 808 is configured such that when processor 802 executes software 808, base station 106 performs steps described above (e.g., steps described above with reference to the flow chart shown in FIGS. 4 and 5). For example, software 808 may include: (1) computer instructions (e.g., a RAT layer determining module) for determining the number of layers associated with a RAT to instruct a UE to monitor, wherein the determined number of layers may be (a) equal to a predetermined maximum number of layers associated with the RAT or (b) less than said predetermined maximum number of layers associated with the RAT. The RAT layer determining module may be configured to make the determination based, at least in part, on capability information received from the UE.

Figure 9:
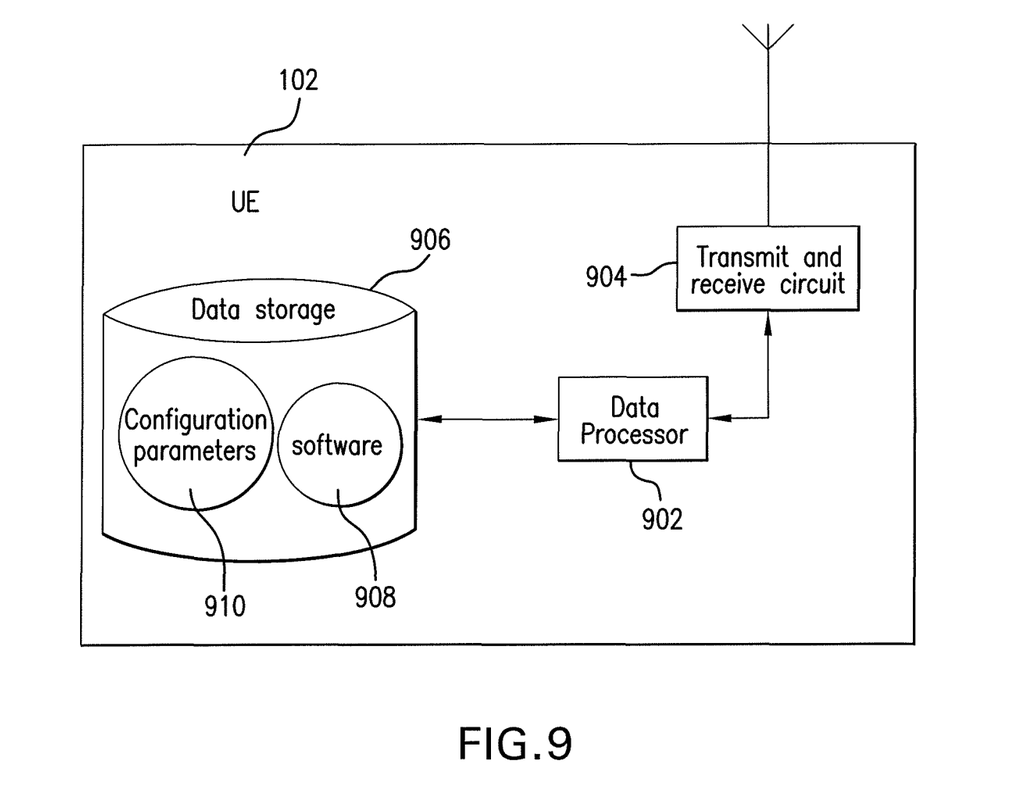
FIG. 9 illustrates a UE in accordance with an aspect of the present invention.

Referring now to FIG. 9, FIG. 9 is a functional block diagram of UE 102 according to some embodiments of the invention. As shown, UE 102 may comprise a data processing system 902 (e.g., one or more microprocessors), a data storage system 906 (e.g., one or more non-volatile storage devices) and computer software 908 stored on the storage system 906. Configuration parameters 910 may also be stored in storage system 906. UE 102 also includes transmit/receive (Tx/Rx) circuitry 904 for transmitting data to and receiving data from a base station. Software 908 is configured such that when processor 902 executes software 908, UE 102 performs steps described above (e.g., steps described above with reference to the flow chart shown in FIG. 6). For example, software 908 may include: (1) computer instructions (e.g., a capability information module) for creating a message comprising capability information. As discussed herein, the capability information may include: (1) radio access technology (RAT) capability information identifying a plurality of RATs supported by the UE (each of the plurality of RATs may be associated with a predetermined maximum number of layers that the UE may be instructed by a network node to monitor) and (2) RAT layer capability information indicating that the UE is configured to monitor less than the predetermined maximum number of layers associated with at least one of the plurality of RATs.

In the foregoing described embodiments, reporting of capability information can be done in connected mode and may also be reported at the call setup or in some cases after handover. In one embodiment, capability information is reported via RRC signaling. In idle mode, cell reselection is based on the broadcast parameters. Thus, the network will broadcast parameters related to all the layers it supports. However, the UE will monitor layers according to its capabilities.

ABBREVIATIONS

UE: User Equipment
UTRAN: UMTS Terrestrial Radio Access Network
LTE: Long Term Evolution
CDMA2000 1× RTT: CDMA2000 1× Radio Transmission Technology
E-UTRAN: Evolution UMTS Terrestrial Radio Access Network
HRPD: CDMA2000 High Rate Packet Data IF: Inter Frequency
IRAT: Inter RAT
OFDM: Orthogonal Frequency Division Modulation
OFDMA: Orthogonal Frequency Division Multiple Access
WCDMA: Wide Band Code Division Multiple Access
RAT: Radio Access Technology
CPICH: Common Pilot Channel
RSRP: Reference Symbol Received Power
RSRQ: Reference Symbol Received Quality
RSSI: Received Signal Strength Indicator
RAT: Radio Access Technology
RRC: Radio Resource Control While various embodiments of the present invention have been described above, it should be understood that they have been presented by way of example only, and not limitation. Thus, the breadth and scope of the present invention should not be limited by any of the above-described exemplary embodiments.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

What is claimed is:

1. A method performed by a base station, comprising:
receiving capability information from a user equipment (UE), wherein said capability information comprises radio access technology (RAT) capability information identifying a set of RATs supported by the UE, wherein each RAT is associated with a predetermined maximum number of layers that the UE may be instructed to monitor, said predetermined maximum number of layers being a standardized value; and
for at least one of said RATs included in the set of RATs:
determining the number of layers associated with the RAT to instruct the UE to monitor, wherein the determined number of layers is less than said predetermined maximum number of layers associated with the RAT, wherein the determination is based, at least in part, on at least some of the received capability information; and
after the determining step, transmitting to the UE RAT layer monitoring information, wherein the RAT layer monitoring information indicates the determined number of layers that the UE should monitor on the RAT, wherein
the received capability information further comprises RAT layer capability information indicating that the UE is configured to monitor less than the predetermined maximum number of layers associated with at least one of the RATs included in the set of RATs, and
the method further comprises storing configuration information that, for each of a plurality of sets of RATs, associates a number with at least one RAT included in the set, wherein said number represents a number of layers associated with the RAT.

2. The method of claim 1, wherein the determining step comprises accessing said configuration information and using said configuration information to determine the number of layers associated with the RAT to instruct the UE to monitor.

3. The method of claim 2, wherein the step of using said configuration information comprises finding the set of RATs included in the configuration information that matches the set of RATs identified by the RAT capability information.

4. The method of claim 1, wherein the RAT layer capability information comprises, for each RAT included in the set of RATs, a number associated with the RAT, said number representing a maximum layer monitoring capability.

5. The method of claim 1, wherein the RAT layer capability information comprises, for at least one of the RATs included in the set of RATs, a number associated with the RAT, said number representing a maximum layer monitoring capability and said number being less than the predetermined maximum number associated with the RAT.

6. The method of claim 1, wherein the RAT layer capability information comprises, for each RAT included in the set of RATs, a single bit, wherein the value of the bit identifies whether or not the UE is configured to monitor the predetermined maximum number of layers associated with the RAT.

7. A base station, comprising:
a receiver operable to receive capability information transmitted from a user equipment (UE), wherein said capability information comprises radio access technology (RAT) capability information identifying a plurality of RATs supported by the UE, wherein each RAT is associated with a predetermined maximum number of layers that the UE may be instructed to monitor;
a RAT layer determining module configured to determine the number of layers associated with a RAT to instruct the UE to monitor, wherein the determined number of layers may be less than said predetermined maximum number of layers associated with the RAT, and wherein the RAT layer determining module is configured to make the determination based, at least in part, on at least some of the received capability information; and
a transmitter operable to transmit to the UE RAT layer monitoring information, wherein the RAT layer monitoring information indicates the number of layers associated with the RAT that the UE should monitor, wherein
the capability information further comprises RAT layer capability information indicating that the UE is configured to monitor less than the predetermined maximum number of layers associated with at least one of the plurality of RATs, and
the base station further comprises a data storage device for storing configuration information that, for each of a plurality of sets of RATs, associates a number with at least one RAT included in the set, wherein said number represents a number of layers associated with the RAT.

8. The base station of claim 7, wherein
the RAT layer determining module is configured to determine said number of layers by accessing said configuration information and using said configuration information to determine the number of layers associated with the RAT to instruct the UE to monitor.

9. The base station of claim 8, wherein RAT layer determining module is configured to use said configuration information by finding the set of RATs included in the configuration information that matches the plurality of RATs identified by the RAT capability information.

10. The base station of claim 7, wherein the RAT layer capability information comprises, for each RAT included in the plurality of RATs, a number associated with the RAT, said number representing a maximum layer monitoring capability.

11. The base station of claim 7, wherein the RAT layer capability information comprises, for at least one of the RATs included in the plurality of RATs, a number associated with the RAT, said number representing a maximum layer monitoring capability and said number being less than the predetermined maximum number associated with the RAT.

12. The base station of claim 7, wherein the RAT layer capability information comprises, for each RAT included in the plurality of RATs, a single bit, wherein the value of the bit identifies whether or not the UE is configured to monitor the predetermined maximum number of layers associated with the RAT.

13. A method performed by a base station, comprising:

receiving capability information from a user equipment (UE), wherein said capability information comprises radio access technology (RAT) capability information identifying a set of RATs supported by the UE, wherein each RAT is associated with a predetermined maximum number of layers that the UE may be instructed to monitor, said predetermined maximum number of layers being a standardized value;

for at least one of said RATs included in the set of RATs:
  determining the number of layers associated with the RAT to instruct the UE to monitor, wherein the determined number of layers is less than said predetermined maximum number of layers associated with the RAT, wherein the determination is based, at least in part, on at least some of the received capability information; and
  after the determining step, transmitting to the UE RAT layer monitoring information, wherein the RAT layer monitoring information indicates the determined number of layers that the UE should monitor on the RAT; and storing configuration information that, for each of a plurality of sets of RATs, associates a number with at least one RAT included in the set, wherein said number represents a number of layers associated with the RAT, wherein the determining step comprises accessing said configuration information and using said configuration information to determine the number of layers associated with the RAT to instruct the UE to monitor.

14. The method of claim 13, wherein the step of using said configuration information comprises finding the set of RATs included in the configuration information that matches the set of RATs identified by the RAT capability information.

15. A base station, comprising:

a receiver operable to receive capability information transmitted from a user equipment (UE), wherein said capability information comprises radio access technology (RAT) capability information identifying a plurality of RATs supported by the UE, wherein each RAT is associated with a predetermined maximum number of layers that the UE may be instructed to monitor;

a RAT layer determining module configured to determine the number of layers associated with a RAT to instruct the UE to monitor, wherein the determined number of layers may be less than said predetermined maximum number of layers associated with the RAT, and wherein the RAT layer determining module is configured to make the determination based, at least in part, on at least some of the received capability information;

a transmitter operable to transmit to the UE RAT layer monitoring information, wherein the RAT layer monitoring information indicates the number of layers associated with the RAT that the UE should monitor; and a data storage device for storing configuration information that, for each of a plurality of sets of RATs, associates a number with at least one RAT included in the set, wherein said number represents a number of layers associated with the RAT, and the RAT layer determining module is configured to determine said number of layers by accessing said configuration information and using said configuration information to determine the number of layers associated with the RAT to instruct the UE to monitor.

16. The base station of claim 15, wherein RAT layer determining module is configured to use said configuration information by finding the set of RATs included in the configuration information that matches the plurality of RATs identified by the RAT capability information.

* * * * *